March 3, 1936.  J. W. SCOTT  2,032,507
TIRE RASP
Filed June 26, 1935
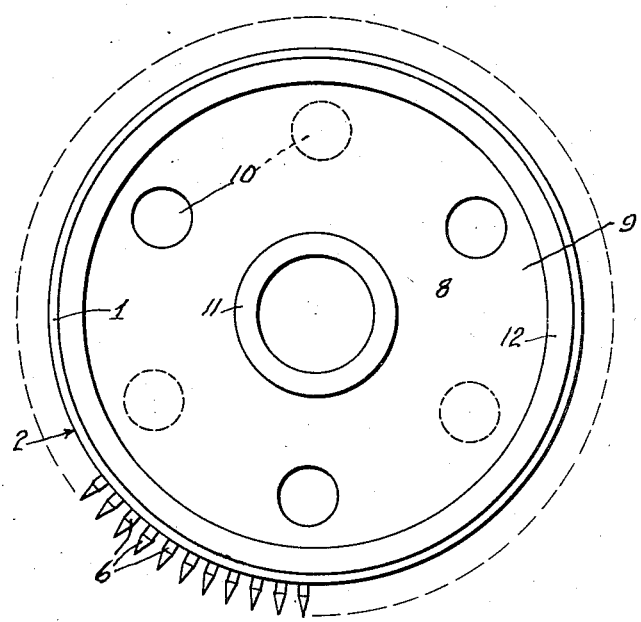
Fig. 1.
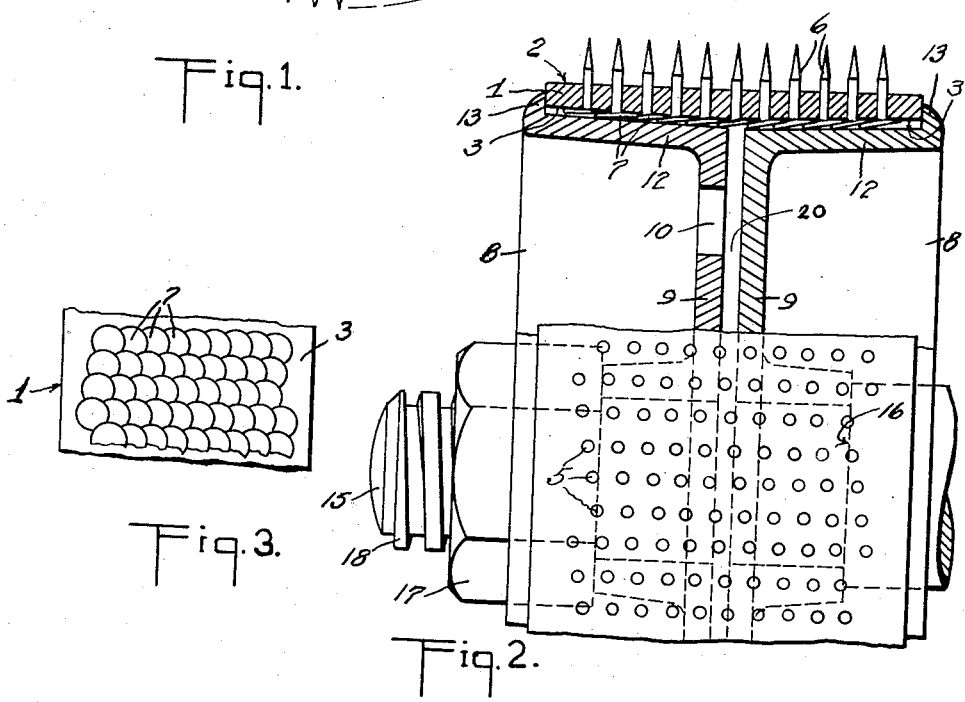
Fig. 3.
Fig. 2.
INVENTOR.
JAMES. W. SCOTT.
BY Horace Barnes,
ATTORNEY.

Patented Mar. 3, 1936

2,032,507

UNITED STATES PATENT OFFICE 2,032,507

TIRE RASP

James W. Scott, Los Angeles, Calif.

Application June 26, 1935, Serial No. 28,472

7 Claims. (Cl. 29—78)

This invention relates to improvements in rasps for excoriating tires in the removal of the tread material from a tire-casing preparatory to retreading as well as for other general purposes; and further relates to improvements in the rotatable tire-rasp of the class described and claimed in my prior Patent No. 1,832,509, dated November 17, 1931.

The object of the present invention is to provide a tire rasp of simple and practicable construction which is adapted to be rotatably actuated at relatively high speeds through the more perfect balance of its component parts, and which may be assembled and maintained in reliable operative condition without the employment of especial securing devices.

A further object of my invention is to provide a tire rasp of the type set forth comprising an external perforated annulus through which the spike-like teeth protrude and are supported and having its internal surface formed from each end in bearing faces of conical configuration to receive correspondingly conical hub-elements adapted to bear upon the heads of the spike-teeth when wedged therein from the opposite ends of the annulus.

Other objects and advantages residing in my invention, and objects relating to details of construction and adaptation of parts thereof, will be readily apparent in the course of the detailed description to follow.

The accompanying drawing illustrates by way of example a representative form of my invention, in which:

Figure 1 is a view in side elevation of a tire rasp embodying my invention.

Fig. 2 is a fragmentary view, partly in section and partly in face elevation, of the same.

Fig. 3 is a fragmentary view of the inner side of the spike-holding annulus, showing the lapped relation of the spikes therein.

Referring to said views, the reference numeral 1 indicates a cylindrical ring or annulus having an outer surface 2 disposed in straight transverse lines while its inner surface is formed in two symmetrically opposed inclined or conical faces 3 extending from the opposite ends of the ring and intersecting in substantially the medial transverse axis thereof. Said ring is formed with a multiplicity of radially extending perforations 5 arranged in transverse rows substantially parallel with the longitudinal axis of the ring and arranged in regularly stepped order to provide spiral lines of perforations circumferentially of the ring, as best seen in Fig. 2.

Headed, round-pointed spikes 6 of suitable lengths are extended through the perforations 5, their heads 7 being arranged in scaled or partially overlapping relation on the inner side of the ring with their points protruded beyond the external face 2. Said overlapping arrangement of the spike-heads may be continuous from side to side of the ring, as seen in Figs. 2 and 3, or may extend in oppositely scaled formation from the transverse axial line outwardly to each end. Said spikes are driven through said perforations to extend outwardly in spaced relation corresponding to the described arrangement of the perforations, the spiral circumferential disposition of which lends a peculiarly effective presentation of the spikes for the accomplishment of the rasping or tread-removing work as completely closing any circumferential channels unguarded by the spikes and causing every portion of the tire-tread presented to the rasp to be torn and rasped away. The heads 7 of the spikes being driven in closely against the inner faces 3 of the ring assume substantially the same conical configuration.

A pair of hub-wheels 8 are provided to be inserted within the ring from opposite ends thereof and each consists of a radial web 9 provided with apertures 10, a central outwardly extending hub 11 and a tapered rim 12 having an external out-turned flange 13. Said rims are tapered to substantially the same degree as the inclinations of the faces 3 of the ring and the wheels are arranged to be driven in from the opposite sides of the ring to closely engage the heads 7 of the spikes and to securely wedge them in set condition and under the relatively severe frictional contact thus set up to provide a rasp unit in operative condition for mounting upon a power-driven arbor 15 extending through the aligned hubs 11. The inner hub will be abutted upon a shoulder 16 of the arbor where the rasp is secured by a nut 17 engaged with screw-threads 18 upon the arbor and pressing upon the outer hub to reliably secure the hub-wheels in their operative condition and safeguard against any loosening of the frictional engagement thereof with the ring as well as maintaining the rasp as a whole in its proper working condition to rotate with the arbor.

The flanges 13 limit the inward thrust of the hub-wheels and are disposed so that they will engage the outer edges of the rings to provide a limited space 20 interposed between the wheel-webs 9 when fully set up. Also when setting the hub-wheels in place care is taken that the apertures 10 of the webs will not be in register with those of the opposing web but will be presented to a solid portion of the opposite web so that a suitable tool or bar may be inserted through any such aperture and with a few taps of a hammer the hub-wheels may be readily loosened.

What I claim, is:

1. A tire rasp, consisting of a perforated ring having its inner surface formed with inclined faces extending inwardly from each of its opposite ends, spikes extending through said perforations with their heads lying against said faces, and a pair of hub-wheels each having a radial web adjacent one of its sides and a tapering rim extending outwardly therefrom, said rims being adapted to be inserted in the opposite ends of said ring to bear against said spike-heads.

2. A tire rasp, consisting of a perforated ring having its inner surface formed with inclined faces extending inwardly from each of its opposite ends, spikes extending through said perforations with their heads lying against said faces in overlapping relation, and a pair of hub-wheels having tapering rims inserted in the opposite ends of said ring to bear against said spike-heads.

3. A tire rasp, consisting in a perforated ring formed with oppositely inward inclined faces on its inner surface, a multiplicity of spikes extending through said perforations, the outwardly projecting ends of said spikes being arranged in transverse rows substantially parallel with the axis of said ring and disposed in spiral lines circumferentially of the ring, and a pair of hub-wheels each having a conical rim adapted to enter said ring from opposite sides and frictionally engaging the inner ends of said spikes.

4. A tire rasp, consisting of a perforated ring formed with oppositely inclined faces on its inner surface, a multiplicity of spikes extending through said perforations and having their heads engaging the inner faces of the ring in overlapping relation, and a pair of hub-wheels having an outer rim in conical configuration conforming to the inclined faces of the ring and arranged to be engaged therein for frictional connection upon the heads of said spikes.

5. A tire rasp, consisting of a perforated ring formed with oppositely inclined faces on its inner surface, a multiplicity of spikes extending through said perforations having their heads engaging the inner faces of the ring, a pair of hub-wheels having an outer rim in conical configuration conforming to the inclined faces of the ring and arranged to be engaged therein for frictional connection upon the heads of said spikes, and a flange on each said rim engageable with said ring to limit the entrance of the hub-wheels within said ring.

6. A tire rasp, consisting of a perforated ring formed with oppositely inclined faces on its inner surface, a multiplicity of spikes extending through said perforations having their heads engaging the inner faces of the ring, and a pair of hub-wheels each having an outer rim in conical configuration conforming to the inclined faces of the ring and arranged to be engaged therein for frictional connection upon the heads of said spikes, said hub-wheels each having an outer marginal flange on said rims to engage said ring to limit the entrance of the hub-wheel within the ring and an apertured web at its inner side, and means to secure said hub-wheels within said ring.

7. A tire rasp, consisting of a perforated ring having its inner surface formed with inclined faces extending inwardly from each of its opposite sides, spikes extending through said perforations with said heads lying against said faces, and a pair of hub-wheels each having a radial web adjacent one of its sides and a tapering rim extending outwardly therefrom said rims being adapted to be inserted in the opposite ends of said ring to bear against said spike-heads, the outer edges of said rims having flanges adapted to engage the ring to limit the entrance of said hub-wheels within the ring.

JAMES W. SCOTT.